United States Patent Office 3,225,019
Patented Dec. 21, 1965

3,225,019
ELASTOMERIC POLYMERS
Edward C. Leonard, Jr., Plainfield, N.J., assignor to Union
Carbide Corporation, a corporation of New York
No Drawing. Filed June 30, 1961, Ser. No. 120,905
10 Claims. (Cl. 260—88.2)

This application is a continuation-in-part of my application, Serial No. 705,484 filed December 27, 1957, and now abandoned.

This invention relates to an improved process for preparing copolymers of ethylene and lower 1-olefins such as propylene, butenes, pentenes, etc. More particularly this invention relates to a process for preparing rigid and semi-rigid, easily extrudable amorphous copolymers of ethylene and 1-olefins containing only small amounts of low molecular weight polymeric oils, and which have improved stress crack resistance and low brittle temperatures, without suffering melt fracture extrusion problems.

Copolymers of ethylene and propylene heretofore prepared by what is now commonly known as the Ziegler technique for the most part has been formed to contain a high percentage of low molecular weight polymeric oils and are regarded as highly crystalline. The oily component of such copolymers will, in most cases, range between about 10 and 15 percent by weight of the polymer, and gives the resulting copolymers a soft and sticky texture. Crystalline content of such copolymers is generally between 50 to 80 percent. Thus the presence of this oil in addition to the high crystalline content of such copolymers significantly affects their elastic properties and seriously limits the usefulness of any of these copolymers as elastomers.

Other methods have been attempeted to secure copolymeric products of ethylene and 1-olefins free of such oils which are no longer soft, tacky, poorly elastic materials but are instead solid, rubbery materials with good extensibility having none of the surface tackiness which characterized the products produced by the existing methods. For example, in my U.S. application Serial No. 705,484, filed December 27, 1957, the problem of high crystallinity and high oil content was solved by the use of a catalyst system comprising a trialkyl aluminum, and either vanadium trichloride or the purple titanium trichloride in a hydrocarbon solvent. Such products as prepared have extremely low polymeric oil content and the crystallinity of such materials is quite low, generally less than 15 percent, and most often is absent or undetectible by infrared spectrum.

These products containing about 30 percent or more combined 1-olefin are rubbery, highly elastomeric products of excellent mechanical properties. They possess high toughness and elasticity, excellent heat and ozone resistance and good low temperature properties. They retain such properties even after vulcanization or crosslinking.

At lower amounts of combined 1-olefin, i.e., less than 20 percent, the copolymers become less extensible and are tougher. They have in general, a 1 percent secant modulus in tension of about 10,000 p.s.i. or more and can be considered as semi-rigid or rigid materials. They possess exceptionally good resistance to stress cracking and excellent toughness. However, this toughness while desirable for many applications of these copolymers, makes them somewhat difficult to extrude and imparts surface roughness to the extrusions.

These copolymers, as produced, have very low melt indices, i.e. about 0.1 or below, which for certain end uses must be increased to make them extrudable. This combination of properties becomes a commercial detriment for extrusion items such as wire coatings, films, sheets and the like. The surface roughness of these products is of such magnitude as to render such products commercially unacceptable for most intended end uses where the advantages of low temperature properties and toughness are most important, and the difficulty in extrusion makes them difficult for commercial fabricators to handle.

This surface roughness and extrusion difficulty has been characterized in the art as "melt fracture," which is the name given to an assortment of undesirable surface defects and extrusion irregularities, most usually manifests itself in the form of rough, corkscrew-like surfaces on the extruded piece. While the magnitude of this deficiency may vary widely from one material to another, any degree of melt fracture is generally prohibitive, commercially.

Commercial fabricators must be able to extrude rapidly with standard industrial equipment to produce articles having smooth surfaces and which faithfully reproduce the extrusion die contours. For most favorable results in this respect in wire coating applications, it is generally desirable that copolymers of the type under consideration herein should have a melt index of from about 0.3 to about 5 and be satisfactorily extrudable at temperatures of the order of 150–230° C. to form smooth surfaces. However, other melt indices may be preferred for other applications.

Those same facts which largely govern extrudability are more or less equally influential in determining the overall processability characteristics of a material, e.g., its formability by injection molding or other methods, its behavior during hot compounding, etc. For instance, the same deficiencies which cause an extruded piece to have rough surfaces may manifest themselves as skinning in an injection molded article.

It is therefore an object of this invention to provide copolymers of ethylene and 1-olefins having less than 20 percent of combined 1-olefin which have melt indices within the range of about 0.1 to 10 and which are easily extrudable and free of the surface roughness and melt fracture problem. It is a further object of this invention to provide an improved process for preparing these polymers by the use of a catalyst system which inhibits high polymeric oil content in the polymer and retains the excellent toughness and low temperature properties of such copolymers, but which are free of melt fracture problems and are readily extruded with a smooth surface.

While the principal objects and benefits of the present invention are to solving the problem of extrudability and melt fracture problems, it should be recognized that other improvements are also realized in the overall processability, handling characteristics and ultimate physical properties of the copolymers.

According to the present invention, it has now been found that easily extrudable ethylene-1-olefin copolymers containing from about 4 to 20 percent combined 1-olefin are prepared free of melt fracture and other extrusion difficulties. The process of this invention comprises an improvement in the process of copolymerizing ethylene and lower 1-olefins in an inert non-polar solvent with a catalyst composition of a trialkyl aluminum and the purple form of titanium trichloride. The present improvement consists of conducting the copolymerization reaction at temperatures between about 110° C. to 140° C., and preferably at about 125° C.

While I am unable to completely understand the phenomena existing that explains the lack of melt fracture and ease of extrusion of these copolymers over the low temperature polymerized copolymers, the improvement is quite dramatic and significant. It provides a means for the utilization of the excellent toughness and low temperature properties of these copolymers to such extrusion applications as wire coating, filament extrusion, metal foil and paper coating and like uses where heretofore such materials were not useful.

In this invention, it is necessary that the catalysts be suspended or dissolved in an inert non-polar solvent for the monomers in order to provide reactive contact for the ethylene and 1-olefin monomer. Such solvents as saturated aliphatic hydrocarbons as heptane, octane and the like, cyclic hydrocarbons as cyclohexane and derivatives thereof, aromatic hydrocarbons such as benzene, toluene and the like as well as halogenated derivatives thereof such as chloro-benzene, di-chlorobenzenes and the like can be employed.

The particular solvent is not critical in this invention. However, since the temperature of reaction is, it is preferred that the solvent have a boiling point above about 140° C. so that the reaction can be conducted at atmospheric pressures. With superatmospheric pressures, however, any of these solvents can be employed. The solvents serve not only as a solvent for the ethylene and 1-olefin, but also as a suspendant for the catalyst, thereby assuring better reactive contact of the monomers with the catalyst in the fluid reaction media. It is preferred in this invention that the solvent be employed in amounts at least sufficient to suspend the catalyst and solvate the monomers, although the amounts do not appear critical. Generally, catalyst solids of 10–15 percent by weight of the solvent-catalyst mixture is preferred.

In this process, any of the aluminum trialkyls compounds can be used as the one catalyst component. As for example, the alkyl can be any of the lower alkyl groups such as methyl, ethyl, propyl, isopropyl, n-butyl, isobutyl, and the like alkyl hydrocarbons having from 1 to about 8 carbon atoms. It is not necessary that all alkyls be the same. Mixed alkyls work equally as well.

The purple form of titanium trichloride employed herein is that such as described by W. C. Schumb et al. (J. Am. Chem. Soc., 55, 596 (1933)). It is preferred that the trichloride be relatively pure and particularly that all or nearly all of the tetrachloride be removed. This latter impurity significantly increases the amount of low molecular weight polymeric oils and is not desirable. The brown form of titanium trichloride should not be used as it does not provide the results indicated herein.

The molar ratio of these two components of this catalyst system is not critical, although it is preferred to have molar ratios of aluminum to titanium of between about 1:1 to 5:1. However, ratios of 20:1 to 1:20 can be employed if desired, but no significant benefit is realized with such excesses of one component.

Temperatures in this process, however, have been found to be quite critical in providing these unusual copolymers. Temperatures between about 110° C. to about 140° C. provide the most desirable results. Lower temperature reactions, e.g. below 100° C., do not provide copolymers free of this melt fracture problem whereas temperatures above about 160° C. produce higher oil content, lower molecular weight polymers.

The ethylene and 1-olefin monomers are best added in this process below the liquid level of the solvent-catalyst mixture, through a suitable gas dispersion device for good reactive contact. The addition of inert gases to the reactor to displace the air over the solvent-catalyst mixture is desirable. If desired, the monomers can be added in admixture or as separate gas streams. Any of the lower 1-olefins having from about 3 to 5 carbons atoms can be used, although the ethylene-propylene and the ethylene-1-butene copolymers are the most desirable for most of our intended uses, such as wire and cable coatings and paper coating.

Molar ratios of 1-olefin to ethylene of from about 0.03 to 0.3 mole per mole of ethylene have been found to be satisfactory in introducing from about 4 to about 20 percent of the 1-olefin into the copolymers, with the lower molecular weight 1-olefin monomers polymerizing somewhat more rapidly than the higher ones. Molar amounts of 0.05 to 0.2 mole of the 1-olefin monomer per mole of ethylene in the feed stream will provide best results, and are most preferred. Optimum feed ratios are thus dependent on the amount of the particular 1-olefin desired in the copolymer.

The copolymers produced having high 1-olefin contents, i.e. about 15–20 percent, tend to be more elastic or are semi-rigid as compared to the rigid and less elastic copolymers having from about 4 to 8 percent of the 1-olefin polymerized therein. Physical properties vary somewhat depending on the particular 1-olefin used, but all of the copolymers have been found to exhibit this freedom from melt fracture when prepared in accordance with this process.

The superior crack resistance of these copolymers is most outstanding. Even in the most severe stress cracking test, which employs heat-aged samples tested in Hostapal at 50° C. for 2000 hours, has not caused these copolymers to stress crack. Superior stress crack resistance is retained to melt indices of at least 2.5 and generally higher, and within a modulus range of 15,000 to 62,000 p.s.i. No species of polyethylene are known which exhibit such stress crack resistance at a melt index greater than 0.4 with a modulus greater than 30,000 p.s.i. No known stress cracking test is so severe that qualitative comparisons of resistance to stress cracking between respective copolymers can be made.

It has also been found that these copolymers are quite low in wax and polymeric oil content. As might be expected from the higher temperatures employed, these copolymers have a slightly higher oil content than those made by the lower temperature operation of Serial No. 705,484. Here, most copolymers are between about 1 to 3 percent by weight of low molecular weight polymeric oils, which is considered quite low.

It has been found that the amount of low molecular weight oils can be reduced and controlled by controlling the purity of the titanium trichloride, particularly in the tetrachloride content. The presence of significant amounts of titanium tetrachloride in the catalyst increases the amount of these polymeric oils. Hence, it is preferred that a relatively tetrachloride-free titanium trichloride be used. The presence of any large amounts of such oily materials not only renders the product significantly sticky and tacky, but also creates sweat-out problems and impairs the strength of the copolymer and makes it quite soft. The presence of such oils can be detected by extracting the polymer with boiling acetone or with ether, either of which acts as a solvent for such oils, and determining the weight content of the polymer of the extracted material.

However, the amount of oils experienced in these products is considered quite tolerable and acceptable compared to the copolymers made using titanium tetrachloride instead of the trichloride, where oil contents of 15 percent are common and become intolerable for quality extrusion of goods.

The density of the copolymers produced by this process are within the conventional range of about 0.90 to 0.94, depending to a great extent on the amount of and the particular 1-olefin in the copolymer. Large amounts of the 1-olefin tend to lower the density. However, these copolymers differ considerably from those made at low temperatures by the higher melt indices. Whereas most of the copolymers made at room temperatures with this catalyst system to contain from 4 to 20 percent by weight of combined 1-olefin have melt indices of less than 0.1, the majority of the copolymers prepared by this process have melt indices between about 0.1 and 2.0, in addition to being free of the melt fracture problems previously experienced, although copolymers having melt indices of up to 10 can be made by this technique without pyrolysis. Even pyrolysis of the low temperature polymerized copolymers while increasing the melt index to within this range, has failed to correct the melt fracture and extrusion problems.

The following examples will serve to illustrate this invention but should not be construed as limiting in any way the invention as hereinbefore described. Unless otherwise indicated, all parts and percentages are by weight.

Example I illustrates the conventional low temperature technique and serves to illustrate the critical necessity of conducting the reaction at elevated temperatures. It is not a part of the present invention.

EXAMPLE I (A) Seven hundred and fifty ml. of o-dichlorobenzene were placed in a 2-liter flask equipped with gas inlet, stirrer, thermometer and gas outlet. Ethylene and propylene were passed into the solvent at rates of eight liters and 0.87 liter per minute, respectively. To this solution was added 10 millimoles of triisobutylaluminum, then five millimoles of the purple form of titanium trichloride suspended in 7.5 ml. of toluene. The monomers were passed through the solution for one hour while the temperature was maintained at 30 to 50° C. At the end of this time, an equal volume of 95 percent ethanol was added to destroy the catalyst and precipitate the polymer. After filtration and drying, the yield of polymer was 60 grams. This product had a melt index of zero; and its processability was so bad that it could not be extruded under any of the test conditions used. Extractable oils are less than 1 percent.

(B) In an effort to improve the processability of the above-described zero melt index material, it was thermally degraded by being passed through a heated (400–500° C.) tube under substantially anaerobic conditions and at such a rate that its melt index was increased to about 3.

The properties of the foregoing copolymers appear in Table I.

EXAMPLE II

The reactor, solvent, and amounts of catalyst were the same as in Example I. Prior to the addition of catalyst, the solvent was heated to 120° C. After the addition of catalyst, ethylene and propylene were introduced at rates of eight liters and 0.87 liter per minute, respectively, and this rate of monomer addition was continued for one hour with the temperature maintained between 120 and 125° C. The polymer was worked up in the same manner as in Example I, the yield being 50 grams. The properties of the polymer are shown in Table I. Extractable oils are less than 5 percent.

EXAMPLE III

The reactor, solvent, amount of catalyst and temperature of copolymerization are the same as in Example II. The relative amounts of monomer are different, so that sixteen liters of ethylene and 0.87 liter of propylene per minute were passed into the reactor for one hour. The yield of polymer was fifty grams. Polymers properties are given in Table I. Extractable oils are less than 5 percent.

The processability of the above-described copolymers of Examples I, II and III was determined by extruding them into monofilament under various conditions and carefully examining the extruded product. The tests were conducted with a 1″ NRM (National Rubber Machinery Co.) extruder equipped with a single orifice, 0.05″ diameter, monofilament die. Temperatures (of the compound at the die) were varied from 150° C. to 190° C. and extrusion speed from 20 to 200 ft./min.

As previously indicated, copolymer (A) of Example I could not even be extruded under any of these conditions. Pyrolyzed product (B) of Example I was extrudable, but gave unacceptable monofilament (melt fracture) under even the most favorable extrusion conditions, i.e., at a rate of 20 ft./min. at 190° C. The products of Examples II and III, illustrative of this invention, on the other hand, gave excellent quality monofilament in every case, including the most demanding conditions tried, i.e., at a rate of 200 ft. per min. at 150° C.

These and other test results are summarized in the following table, in which the following determinations were made by the following tests.

Wt. percent propylene _____ Infrared analysis.
Melt index decigrams/minute ASTM Test D–1238–57T.
Density—grams per milliliter at 25° C. _____ ASTM Test D–792–50.
Modulus—1% secant modulus in tension at 25° C. _____ ASTM Test D–638–58T.
Stress crack resistance _____ ASTM Test D–1693–59T.
Brittle temperature _____ ASTM Test D–746–55T.

Table I

|  | Example I | | Example II | Example III |
|---|---|---|---|---|
| Wt. percent propylene in monomer feed stream | 14.0 | | 14.0 | 7.5 |
| Reaction temp. (° C.) | 30–50 | | 120–125 | 120–125 |
|  | A | B | | |
| Properties of Copolymer: | | | | |
| Wt. percent of propylene | 9 | 9 | 10 | 4 |
| Melt index (dg./min.) | Zero | 2.9 | 3.0 | 0.2 |
| Density at 25° C. (g./ml.) | 0.920 | 0.920 | 0.920 | 0.936 |
| Modulus at 25° C. (p.s.i.) | 35,000 | 36,000 | 34,000 | 60,000 |
| Stress crack resistance (F₅₀, in hrs. in 100% Igepal at 50° C.) | ---- | 40 | >500 | >500 |
| Extrudability | Nil | (¹) | Excellent | Excellent |
| Brittle temp. (° C.) | –100 | –100 | –100 | –100 |

¹ Very poor.

EXAMPLE IV

Employing the procedure described in Example II, using a catalyst solution comprising 10 millimoles of triisobutyl aluminum and 5 millimoles of purple titanium trichloride suspended in 1000 ml. of heptane. Ethylene and butene-1 monomers were passed into the catalyst-solvent mixture for 30 minutes at rates of 8.0 liters per minute and 0.9 liter per minute respectively, while polymerization reaction was maintained at 125° C. after which time the polymer was recovered as in Example II.

The following properties were noted for two different amounts of butene-1 in the copolymer. All properties being determined by tests as heretofore indicated.

Table II

|  | IV A | IV B |
|---|---|---|
| Percent butene-1 in copolymer (infrared analysis) | 9 | 6. |
| Melt index | 6.0 | 0.5. |
| Stiffness (p.s.i.) | 20,000 | 48,000. |
| Extensibility (percent) | 1,000 | 750. |
| Stress crack resistance ($F_{50}$ at 50° C.): | | |
| Hours in Igepal | No breaks in 504 hours | No breaks in 504 hours. |
| Hours in Hostapal | do | Do. |
| Extrusion characteristics | No melt fracture even at shear rate of 12 sec.$^{-1}$. | No melt fracture. |

Comparable ethylene-propylene copolymers were prepared by the same technique. One had a propylene content of 10 percent, a melt index of 3.0 and a stiffness modulus of 34,000 p.s.i. and the other had a propylene content of 5 percent, a melt index of 0.2 and a stiffness modulus of 72,000 p.s.i. Neither exhibited melt fracture on extrusion as described in Examples I–III.

EXAMPLE V

Employing the technique described in Example II, the following summary of examples shows that with titanium tetrachloride that gross amounts of low molecular weight oils are produced, even with slightly lower polymerization temperatures. At higher polymerization temperatures, the titanium tetrachloride catalyzed copolymer has even higher oil content.

ETHYLENE-BUTENE-1 COPOLYMERS

Table IV

|  | A | B | C | D |
|---|---|---|---|---|
| Percent butene-1 | 1.4 | 8.5 | 6.5 | 6 |
| Ash content | 0.10 | 0.09 | 0.19 | 0.10 |
| Density | 0.917 | 0.932 | 0.933 | 0.927 |
| Melt index (dg./min. at 44 p.s.i.) | 0.29 | 0.12 | 0.08 | 0.08 |
| Flow index (dg./min. at 440 p.s.i.) | 46.8 | 25.0 | 10.2 | 9.4 |
| Flow ratio (flow index÷melt index) | 160 | 208 | 128 | 118 |
| Tensile strength (p.s.i.) | 2,210 | 2,210 | 2,400 | 2,940 |
| Yield strength (p.s.i.) | 1,120 | 1,830 | 1,990 | 1,650 |
| Elongation, percent | 880 | 780 | 830 | 790 |
| Secant modulus (p.s.i. × $10^{-3}$ at 23° C.) | 22.4 | 47.9 | 55.6 | 38.7 |
| Stiffness in torsion (p.s.i. × $10^{-3}$ at 23° C.) | 27.1 | 51.9 | 67.3 | 55.0 |
| Shear strength (p.s.i.) | 2,710 | 3,490 | 3,490 | 3,710 |
| Brittle temp. percent fail at— | | | | |
| −95° C | 26 | 0 | 0 | 0 |
| −100° C | 53 | 20 | 26 | 13 |
| Vicat point, ° C | 85.2 | 104.4 | 107.0 | 103.5 |

|  | A | B | C |
|---|---|---|---|
| Catalyst | 1 gm. TiCl$^4$<br>2 gms. Al(i-Bu)$_3$ | 1 gm. purple TiCl$_3$<br>2 gms. Al(i-Bu)$_3$ | 1 gm. purple TiCl$_3$.<br>2 gms. Al(i-Bu)$_3$. |
| Temperature | 110° C | 125° C | 135° C. |
| Percent propylene in copolymer | 9.4 | 7.4 | 7.0. |
| Density at 25° C. (gms./ml.) | .924 | .930 | .929. |
| Oil extractables (with diethyl ether) | 13.6 | 1.4 | 3.0. |

EXAMPLE VI

Employing the techniques as herebefore described a variety of copolymers were prepared using a catalyst ratio of 3 moles aluminum trialkyl per mole of purple titanium trichloride, at temperatures about 125° C. The properties of these polymers are listed below:

ETHYLENE-PROPYLENE COPOLYMERS

Table III

|  | A | B | C | D | E |
|---|---|---|---|---|---|
| Percent propylene | 18 | 13 | 10.5 | 8 | 7 |
| Ash content | 0.2 | 0.04 | 0.12 | 0.06 | 0.18 |
| Density | 0.900 | 0.918 | 0.916 | 0.929 | 0.928 |
| Melt index (dg./min. at 44 p.s.i.) | 0.28 | 0.50 | 0.40 | 0.19 | 0.09 |
| Flow index (dg./min. at 440 p.s.i.) | 27.0 | 59.8 | 37.1 | 19.0 | 8.28 |
| Flow ratio (flow index÷melt index) | 96 | 118 | 93 | 100 | 93 |
| Tensile Strength (p.s.i.) | 1,610 | 1,220 | 1,180 | 1,800 | 1,840 |
| Yield Strength (p.s.i.) | 790 | 1,050 | 1,040 | 1,620 | 1,620 |
| Elongation, percent | <960 | 670 | 910 | 760 | 820 |
| Secant modulus (p.s.i.× $10^{-3}$ at 23° C.) | 16.4 | 26.3 | 24.1 | 43.0 | 42.6 |
| Stiffness in Torsion (p.s.i.× $10^{-3}$ at 23° C.) | 18.8 | 30.2 | 25.6 | 52.1 | 52.7 |
| Shear Strength (p.s.i.) | 2,370 | 2,630 | 2,450 | 3,230 | 3,260 |
| Brittle temp. percent fail at— | | | | | |
| −95° C | 10 | 0 | 0 | 0 | 0 |
| −100° C | 10 | 10 | 0 | 0 | 0 |
| Vicat point, ° C | | | | | 103.0 |

All of the above copolymers on extrusion are free of melt fracture problems and were easily extrudable. Outstanding among these examples are Example E of Table II and Examples C and D of Table IV where good extrusions were possible even with the very low (0.08–0.09) melt index of the copolymers. This could not be secured with the copolymers made at room temperatures.

I claim:

1. A method of preparing copolymers of ethylene and 1-olefins having from about 4 to 20 percent by weight 1-olefin polymerized therein which comprises the steps of contacting ethylene and 1-olefin monomers having from 3 to 5, inclusive, carbon atoms in a ratio of between about 0.03 to about 0.3 mole of 1-olefin monomer per mole of ethylene with a catalyst composition consisting essentially of a trialkyl aluminum compound wherein the alkyl groups of the said aluminum compound have from about 1 to 8 carbon atoms and purple titanium trichloride in the presence of an inert non-polar solvent for the monomers at a temperature between about 110° C. and 140° C.

2. A method according to claim 1 wherein the monomers are present in amounts of between about 0.05 to 0.2 mole of 1-olefin per mole of ethylene.

3. A method according to claim 2 wherein the 1-olefin monomer is propylene.

4. A method according to claim 2 wherein the 1-olefin is butene-1.

5. A method of preparing copolymers of ethylene and 1-olefins having from about 4 to 20 percent by weight of 1-olefin polymerized therein which comprises contacting a mixture of ethylene and a 1-olefin monomer having from 3 to 5, inclusive, carbon atoms in a ratio of between about 0.05 to 0.2 mole of 1-olefin monomer per mole of ethylene with a catalyst composition consisting essentially of a trialkyl aluminum compound wherein the alkyl groups have from 1 to 4 carbon atoms, and purple titanium trichloride substantially free of titanium tetrachloride, in the presence of an inert non-polar solvent for the monomers at a temperature between about 110° C. and 140° C., the catalyst composition having an aluminum to titanium molar ratio of between about 1:1 to 5:1.

6. The process according to claim 5 wherein the 1-olefin monomer is propylene.

7. The process according to claim 5 wherein the 1-olefin monomer is butene-1.

8. An easily extruded, crack-resistant normally solid copolymer of ethylene and 1-olefin containing from about 4 to 20 percent by weight 1-olefin polymerized therein prepared by the method of claim 1.

9. An easily extruded, crack-resistant normally solid copolymer of ethylene and propylene containing from about 4 to 20 percent by weight propylene polymerized therein prepared by the method of claim 3.

10. An easily extruded, crack-resistant normally solid copolymer of ethylene and butene-1 containing from about 4 to 20 percent by weight of butene-1 polymerized therein, prepared by the method of claim 4.

References Cited by the Examiner

UNITED STATES PATENTS

| | | | |
|---|---|---|---|
| 2,825,721 | 3/1958 | Hogan et al. | 260—94.9 |
| 2,862,917 | 12/1958 | Anderson et al. | 260—94.9 |
| 2,905,645 | 9/1959 | Anderson et al. | 260—94.9 |
| 3,050,471 | 8/1962 | Anderson et al. | 260—88.2 |

FOREIGN PATENTS

| | | |
|---|---|---|
| 552,194 | 11/1956 | Belgium. |
| 822,993 | 11/1959 | Great Britain. |
| 836,333 | 6/1960 | Great Britain. |

JOSEPH L. SCHOFER, *Primary Examiner.*

M. LIEBERMAN, *Examiner.*